(12) United States Patent
Huynh et al.

(10) Patent No.: US 7,963,553 B2
(45) Date of Patent: Jun. 21, 2011

(54) VEHICLE SEAT FOR A VEHICLE

(75) Inventors: Dienhung Huynh, Landshut (DE); Peter Baumgartner, Günzburg (DE); Thomas Steck, Elchingen (DE); Andreas Riedel, Illertissen (DE)

(73) Assignees: Takata-Petri AG, Aschaffenburg (DE); Bayerische Motoren Werke AG, Munich (DE)

( * ) Notice: Subject to any disclaimer, the term of this patent is extended or adjusted under 35 U.S.C. 154(b) by 0 days.

(21) Appl. No.: 12/654,194

(22) Filed: Dec. 14, 2009

(65) Prior Publication Data

US 2010/0148478 A1    Jun. 17, 2010

(30) Foreign Application Priority Data

Dec. 15, 2008   (DE) .......................... 10 2008 062 449

(51) Int. Cl.
*B60R 21/16* (2006.01)
(52) U.S. Cl. .............. 280/730.2; 297/216.13; 297/284.4
(58) Field of Classification Search ............... 280/730.2, 280/728.2; 297/216.13, 216.14, 284.1, 284.4, 297/284.9
See application file for complete search history.

(56) References Cited

U.S. PATENT DOCUMENTS

| 4,607,887 | A  | * | 8/1986  | Vail ........................... 297/452.26 |
| 7,232,174 | B1 | * | 6/2007  | Trott ........................... 296/65.17 |
| 2007/0158930 | A1 |  | 7/2007  | Buono et al. |
| 2010/0283229 | A1 | * | 11/2010 | Feller et al. ................. 280/728.2 |

FOREIGN PATENT DOCUMENTS

| DE | 10 2004 001 216 A1 | 7/2004 |
| DE | 103 07 480 A1 | 9/2004 |
| DE | 103 40 508 A1 | 3/2005 |
| DE | 103 45 834 A1 | 4/2005 |
| DE | 10 2004 006 320 A1 | 9/2005 |
| DE | 10 2006 057 984 A1 | 7/2007 |
| DE | 10 2006 005 137 A1 | 8/2007 |
| DE | 10 2007 012 664 A1 | 9/2008 |
| DE | 10 2007 044 824 A1 | 4/2009 |
| DE | 10 2008 062 449 A1 | 5/2009 |
| DE | 10 2008 010 279 A1 | 8/2009 |
| GB | 2 397 047 B | 2/2006 |
| WO | WO 2006/128513 A1 | 12/2006 |
| WO | WO 2007/077035 A1 | 7/2007 |
| WO | WO-2009/039913 A1 | 4/2009 |

* cited by examiner

*Primary Examiner* — Eric Culbreth
(74) *Attorney, Agent, or Firm* — Foley & Lardner LLP

(57) ABSTRACT

A vehicle seat including a backrest which has a middle part laterally confined by side walls; an airbag module arranged in one of the side walls; adjusting means for adjusting the width of the backrest. The adjusting means have an adjusting element, which is arranged together with the airbag module in the side wall and movable relative to the middle part, via which the position of the side wall is changeable relative to the middle part. The adjusting element is connected to a section of the module housing of the airbag module so that the module housing is moved by moving the adjusting element.

16 Claims, 2 Drawing Sheets

VEHICLE SEAT FOR A VEHICLE

BACKGROUND

The present application relates to a vehicle seat for a vehicle.

Such a vehicle seat is for instance known from DE 103 45 834 A1 (incorporated by reference herein).

SUMMARY

A problem to be solved by at least one disclosed embodiment is to be seen in providing a vehicle seat with an adjusting means for adjusting the width of the backrest, which interferes as little as possible with the deployment of an airbag arranged in the vehicle seat.

According to an exemplary disclosed embodiment, a vehicle seat for a vehicle is provided with
- a backrest which has a middle part laterally confined by side walls;
- an airbag module arranged in one of the side walls;
- adjusting means for adjusting the width of the backrest, whereby
- the adjusting means have an adjusting element, which is arranged with the airbag module in the side wall and is movable relatively to the middle part, via which the position of the side wall is changeable relative to the middle part, whereby
- the adjusting element is connected with the section of the module housing of the airbag module so that the module housing is moved by moving the adjusting element.

The side walls are arranged on both sides of the middle part. For example, one of the side walls (with respect to the vehicle seat installed in the vehicle) faces the long side of the vehicle nearest to the vehicle seat, while the other side wall faces away from this long side of the vehicle. The side walls extend in particular along the main direction of extension of a backrest, e.g. in the installed vehicle essentially along the height direction of the vehicle, and stick out from the middle part in a forward manner in order to provide lateral hold for a vehicle occupant being on the vehicle seat.

The adjusting means are part of a width adjustment of a backrest whereby the backrest width can be changed by modifying the position of the side walls relative to the middle part, e.g. in particular the distance of the two side walls to each other, in order to improve in particular the seating comfort and/or the lateral hold. It is also possible that the adjusting means interact with pre-crash or crash sensors and an adjustment of the side walls occurs as a reaction to a signal of the pre-crash or crash sensors.

The side walls do not have to extend necessarily over the whole height of the backrest. In an example the side walls extend only in an area which is assigned to a thorax or pelvis region of a vehicle occupant sitting on the seat. In a further variant the adjusting means is formed such that the backrest width is changeable, in particular (for instance also exclusively) in the area of the thorax and/or pelvis of a vehicle occupant. Such an adjusting means can be arranged in a side wall extending essentially over the complete height of the backrest, as well as in a shortened side wall.

The airbag module has in particular an inflatable airbag and a gas generator for inflating the airbag whereby the module housing (in particular completely) surrounds the airbag and the gas generator. Since the adjusting element is connected to the module housing, the airbag module is being moved by moving (for instance pivoting) the adjusting element. In case of moving the side walls for instance towards a vehicle occupant sitting on the vehicle seat the airbag module also moves towards the vehicle occupant whereby it is achieved that the airbag when activated is deployed close to the vehicle occupant.

Furthermore, due to the connection of the adjusting element to the module housing, a compact package of width adjustment of the backrest and airbag module is formed which can be installed in particular in a front area of the side wall—in relation to the installed status of the vehicle seat in the vehicle. This enables for instance the application of a smaller airbag so that a smaller airbag module can be installed.

The adjusting element is in particular connected to the section of the module housing in a force locking, form locking or in a firmly bonded manner, for instance screwed, riveted and/or welded. In a further variant, the adjusting element is formed in one piece with the section of the module housing. For example, the adjusting element and the section of the module housing are formed from one piece and are produced, in particular, in a common production process. It is also conceivable that the adjusting element is not only formed in one piece with the section of the module housing but also formed in one piece with the complete module housing.

In a further exemplary embodiment the module housing has two housing parts (for instance in form of half shells) connected to each other whereby the adjusting element is connected with one of the two housing parts. The housing part connected to the adjusting element is in particular a bottom shell to which the airbag and/or the gas generator are fixed.

The second housing part (for instance in form of a module cover) is attached to the bottom shell, in particular after assembly of the airbag and/or the gas generator, and is connected with it, for instance in a force locking or firmly bonded manner.

The section of the module housing connected to the adjusting element has for instance a front side which points to the forward moving direction in the installed vehicle seat, and forms as well a long side of the module housing which faces away from the long side of the vehicle nearest to the vehicle seat, e.g. the section of the module housing connected to the adjusting element forms a front and inner side of the module housing.

In an exemplary variant the adjusting element encompasses a frame of the side wall on a side which points to the forward moving direction in the installed vehicle seat. The frame of the side wall is a structure which mechanically stabilizes the side wall and which extends in particular along the (in relation to the installed vehicle essentially vertical) main direction of extension of the backrest side wall. The frame for instance has in a cross section a round or a longitudinal form. The frames arranged in the two side walls are in particular connected to each other, for instance via a structure extending along the middle part of the back rest.

In a further exemplary embodiment the adjusting element has a first arm being coupled to a second arm which is connected to the section of the module housing or forms the section of the module housing. The second arm is in particular arranged with at least one section on the outer side of the frame, e.g. on a side of the frame facing the long side of the vehicle nearest to the seat in the installed status of the vehicle seat. The first arm extends at least sectionally on an inner side of the frame which faces away from the outer side of the frame. Accordingly, the airbag module is in particular arranged on an outer side of the side wall frame which faces in the installed vehicle seat the long side of the vehicle nearest to the vehicle seat.

Furthermore, the adjusting element is movable in particular in a direction crosswise to the main direction of extension of the side wall (e.g. in the installed status of the vehicle seat approximately parallel to the longitudinal axis of the vehicle) relatively to the middle part and/or pivotable around an axis parallel to the main direction of extension of the side wall. The airbag module of the side wall is—as already mentioned above—in particular also pivoted or displaced by a pivoting or displacing movement of the adjusting element.

In a further exemplary variant the adjusting means have a further adjusting element which is arranged in the second side wall of the backrest opposite to the side wall with the airbag module on the middle part. The further adjusting element is in particular also movable in a direction crosswise to the main direction of extension of the side wall (e.g. forward in the installed status of the seat) relatively to the middle part and/or pivotable around an axis parallel to the main direction of extension of the side wall whereby the width of the vehicle seat is adjustable by moving the two side walls (in particular towards each other or away from each other).

In a further exemplary improvement the airbag module is designed and arranged such that the airbag when activated deploys essentially in forward moving direction. Thereby, the airbag module can in particular be arranged on an outer side of a frame of the side wall whereby the frame exerts for instance a supporting effect for the deploying airbag.

The adjusting element and the airbag module are located side by side for instance along a direction crosswise to the main direction of the extension of the side wall, e.g. they are located side by side in the installed vehicle seat along the vehicle cross direction. Furthermore, the adjusting element and/or the airbag module can be at least sectionally surrounded by upholstery (for instance foam upholstery) of the backrest.

The present application also relates to a vehicle with a vehicle seat as described above.

BRIEF DESCRIPTION OF THE DRAWINGS

In the following description, various embodiments are described with reference to the following figures.

DETAILED DESCRIPTION

Figure 1:
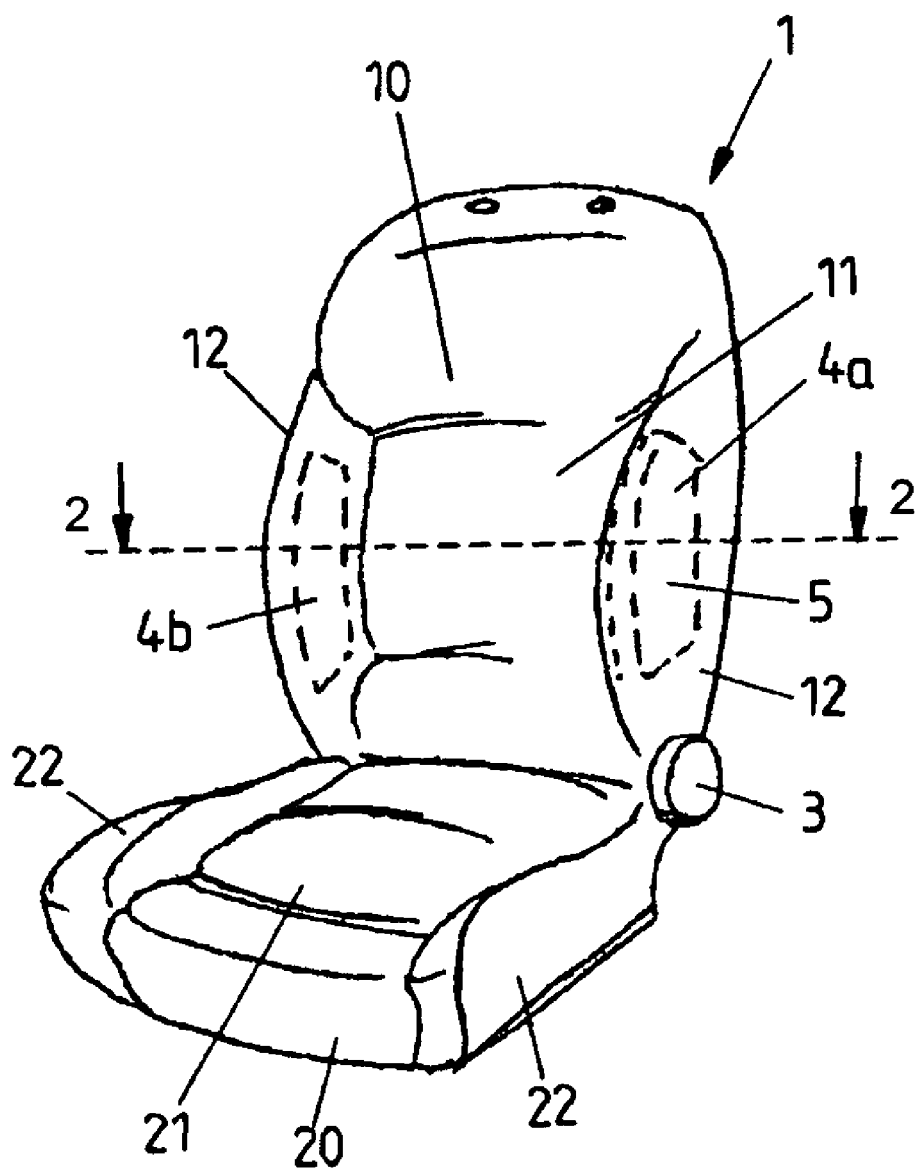
FIG. 1 shows a vehicle seat according to one embodiment.

FIG. 1 represents a vehicle seat 1 having a backrest 10 and a seat part 20 which are pivotably connected to each other via a pivot 3. The backrest has a middle part 11 being laterally confined by the side walls 12 which are located opposite to each other on the middle part 11.

The seat 1 is of course to be installed into the vehicle such that the side walls 12 face in each case towards a long side of the vehicle and are located opposite to each other along the vehicle cross direction. The side walls 12 are furthermore designed such that they stick out with a section from the middle part 11 in forward moving direction so that they laterally support a vehicle occupant being on a seat. The seat part 20 has a middle part 21 constructed as a seat area which is also laterally confined by side wall-like elements 22.

The vehicle seat is equipped with adjusting means for adjusting the width of the backrest whereby in particular the distance of the side walls to each other is changeable via the adjusting means in order to be able to adapt the vehicle seat to the body outlines of a vehicle occupant. The adjusting means have in each case an adjusting element 4a, 4b in each side wall which is indicated in FIG. 1 only schematically (dotted), and enables in particular a change of the position of the side wall relatively to the middle part 11. The positioning of the side wall occurs for instance by moving the adjusting elements in forward moving direction (in relation to the status of the seat installed in the vehicle) and/or by pivoting the adjusting elements and therefore the side walls around an axis which continues along the vertical extension of the backrest.

An airbag module 5 which has a gas generator (not shown) and an airbag (not shown) is arranged additionally to the adjusting element 4 in one of the side walls 12 which faces the nearest long side of the vehicle in the installed vehicle seat.

Figure 2:
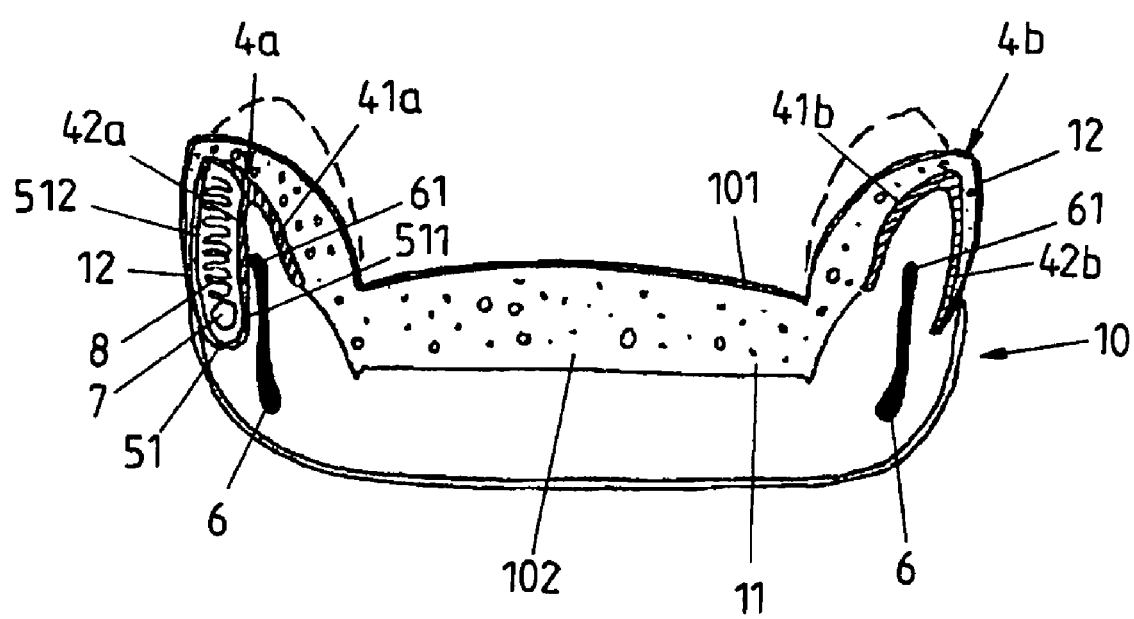
FIG. 2 shows an intersection through the vehicle seat of FIG. 1.

Details of the adjusting means and the airbag module can be taken from FIG. 2 which shows a horizontal intersection (along the line 2-2 in FIG. 1) of the backrest 10. The backrest 10 forms on its front side an area 101 to lean against for a vehicle occupant to which a foam upholstery 102 covered with the seat cover adjoins. On the side of the middle part 11, e.g. in relation to the installed status of the vehicle seat in vehicle cross direction distanced to the middle part 11, a frame structure 6 is arranged in each case which continues essentially along the main extension of the backrest 10 and which has in the cross section a longitudinal form oriented in each case along the vehicle longitudinal direction. The frame structure 6 extends in each case from a rear area of the backrest 10 along the vehicle longitudinal direction into the respective side wall 12.

The adjusting elements 4a, 4b continue around a front side 61 of the frame 6 pointing into the forward moving direction. More precisely, the adjusting element 4b has a first and a second arm 41b, 42b which are arranged at least sectionally on different sides of the frame 6. The adjusting element 4a arranged opposite to the side wall has also a first arm 41a which faces the seat area 101, e.g. a vehicle occupant being on the vehicle seat, and which extends with a section on a side of the frame 6 which also faces the area 101 to lean against.

A second (outer) arm 42a is furthermore connected in one piece to the first arm 41a of the adjusting element. The outer arms 42a, 42b point in each case away from a vehicle occupant being on the seat to the respective long side of the vehicle. The arms 41a, 42a or 41b, 42b extend in particular along the (vertical) main direction of extension of the side walls and have in its cross section in each case essentially a longitudinal form. The length of the arms in direction of the main direction of extension of the side walls corresponds for instance approximately to the height of the side walls. In a further variant the arms are shorter than the side walls, e.g. they extend only over a sub-section of the side walls, for instance in order to position the side walls only in a specific area.

The second arm 42a forms a section (bottom shell 511) of a module housing 51 of the airbag module 5 whereby the module housing 51 encompasses a folded airbag 8 and a gas generator 7 for inflating the airbag. Airbag 8 and gas generator 7 are arranged in particular on the bottom shell 511. The bottom shell 511 forms a first housing part which is connected to the second housing part in form of a cover 512 after assembly of the gas generator and the airbag.

It is pointed out that the example of the first arm 41a shown in FIG. 2 is formed in one piece with the second arm 42a which forms the bottom shell 511 of the module housing 51. It is however also possible that the connection of the two arms 41a, 42a occurs via connecting elements, e.g. in a force locking, form locking or firmly bonded manner.

The second arm 42a is designed such that it forms a section of the module housing which faces away from the vehicle long side nearest to the seat—in relation to the installed status of the seat—as well as a front side pointing to the vehicle front. The first arm 41a and the front side of the second arm 42 adjoin to the upholstery 102 and are therefore surrounded sectionally by the same.

The airbag module 5 is arranged in the side wall 12 such that the airbag when activated is essentially deployed in forward moving direction. The airbag module and the adjusting element 4a are located in particular side by side along a cross direction of the seat, e.g. along the vehicle cross direction in the installed status of the vehicle seat, in a front section of the side wall 12, e.g. the airbag module 5 as well as the adjusting element 4a extend at least sectionally in front of the frame 6 of the side wall 12.

The adjusting elements 4a, 4b are furthermore designed such that they are pivotable along an axis parallel to the main extension of the backrest 10, e.g. along the frame structure 6. Therefore, both side walls can be pivoted from a first position in a second position (shown dotted) whereby their distance to each other changes and therefore the width of the backrest can be adjusted. Simultaneously, the position of the airbag module 5 relatively to the middle part is being changed so that the deploying airbag is positioned near to the vehicle occupant.

The priority application German Patent Application Number 10 2008 062 449.7, filed on Dec. 15, 2008 is incorporated by reference herein in its entirety.

What is claimed is:

1. A vehicle seat for a vehicle with
a backrest which has a middle part laterally confined by side walls;
an airbag module arranged in one of the side walls;
adjusting means for adjusting the width of the backrest, whereby
the adjusting means have an adjusting element, which is arranged together with the airbag module in the side wall and movable relative to the middle part, via which the position of this side wall is changeable relative to the middle part,
wherein the adjusting element is connected with a section of a module housing of the airbag module so that the module housing is moved by moving the adjusting element.

2. The vehicle seat according to claim 1, wherein the airbag module has an inflatable airbag and a gas generator for inflating the airbag, and the module housing surrounds the airbag and the gas generator.

3. The vehicle seat according to claim 2, wherein the airbag module is designed and arranged such that the airbag when activated deploys essentially in forward moving direction.

4. The vehicle seat according to claim 1, wherein the adjusting element is formed in one piece with the section of a module housing.

5. The vehicle seat according to claim 1, wherein the module housing has two housing parts connected to each other and the adjusting element is connected to one of the two housing parts.

6. The vehicle seat according to claim 5, wherein the housing part connected to the adjusting element is a bottom shell, to which at least one of an airbag and a gas generator are fixed.

7. The vehicle seat according to claim 1, wherein the section of the module housing connected to the adjusting element has a front side, which points in forward moving direction in the installed vehicle seat, as well forms a long side of the module housing which faces away from a long side of the vehicle nearest to the vehicle seat.

8. The vehicle seat according to claim 1, wherein the adjusting element encompasses a frame of the backrest on a side which points in forward moving direction in the installed vehicle seat.

9. The vehicle seat according to claim 1, wherein the adjusting element has an arm coupled to a second arm which is connected to the section of the module housing or forms the section of the module housing.

10. The vehicle seat according to claim 9, wherein the arm, which is connected to the section of the module housing or forms the same, is arranged at least sectionally on an outer side of the frame and the other arm is arranged on an inner side of the frame facing the way from the outer side.

11. The vehicle seat according to claim 1, wherein the airbag module is arranged on an outer side of a frame of a backrest which faces in the installed vehicle seat a long side of a vehicle nearest to the vehicle seat.

12. The vehicle seat according to claim 1, wherein the adjusting element is at least one of movable in a direction crosswise to a main direction of extension of one of the side walls and pivotable around an axis parallel to a main direction of extension of the backrest.

13. The vehicle seat according to claim 12, wherein the adjusting means has a further adjusting element in a side wall that is opposite to the side wall with the airbag module which is also at least one of movable crosswise to the main direction of extension of the side wall and pivotable around an axis parallel to the main direction of extension of the backrest.

14. The vehicle seat according to claim 1, wherein at least one of the adjusting element and the airbag module are at least sectionally surrounded by a upholstery of the back rest.

15. The vehicle seat according to claim 1, wherein the adjusting element and the airbag module are essentially located side by side in the installed vehicle seat along a vehicle cross direction.

16. A vehicle with a vehicle seat as claimed in claim 1.

* * * * *